Aug. 2, 1966  O. J. KING ETAL  3,264,212
NATURAL GASOLINE PROCESS AND APPARATUS
Filed Sept. 28, 1965  3 Sheets-Sheet 2
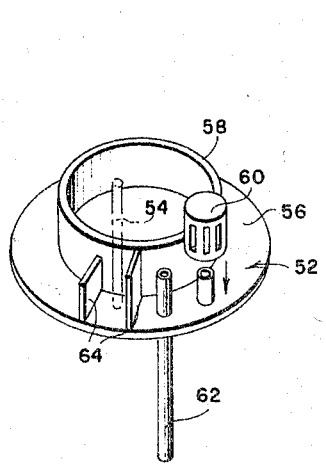
FIG. 3
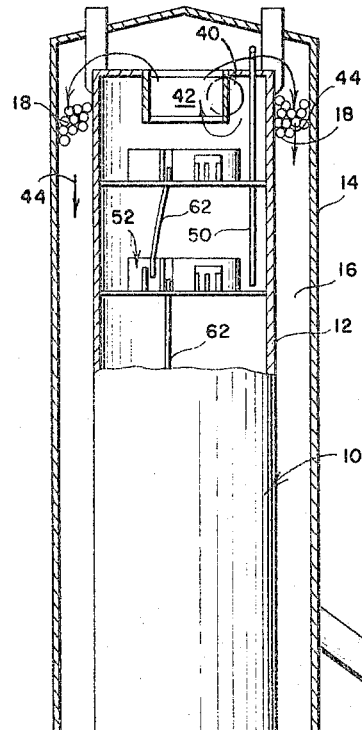
FIG. 2
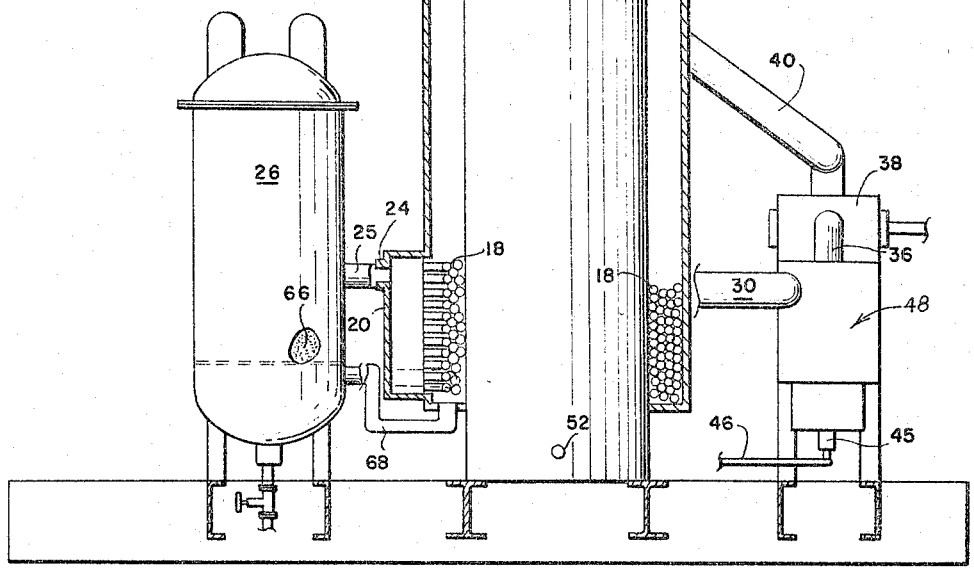
INVENTORS
O. J. KING
RAY E. HUDSON
BY Semmes & Semmes
ATTORNEYS Aug. 2, 1966  O. J. KING ETAL  3,264,212
NATURAL GASOLINE PROCESS AND APPARATUS
Filed Sept. 28, 1965  3 Sheets-Sheet 3
FIG. 4
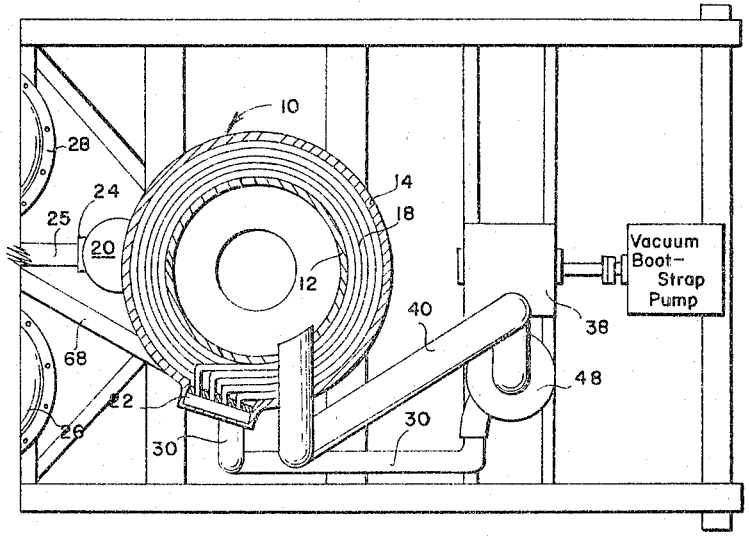
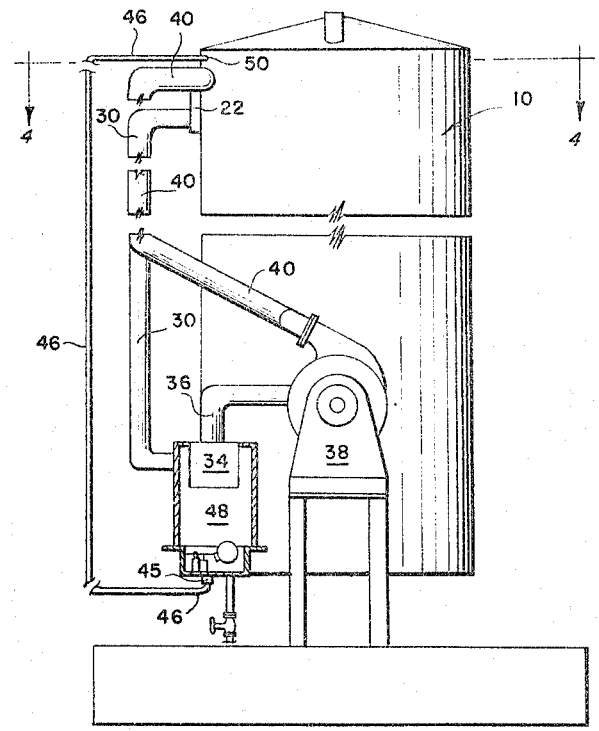
FIG. 5
INVENTORS
O. J. KING
RAY E. HUDSON
BY Semmes & Semmes
ATTORNEYS

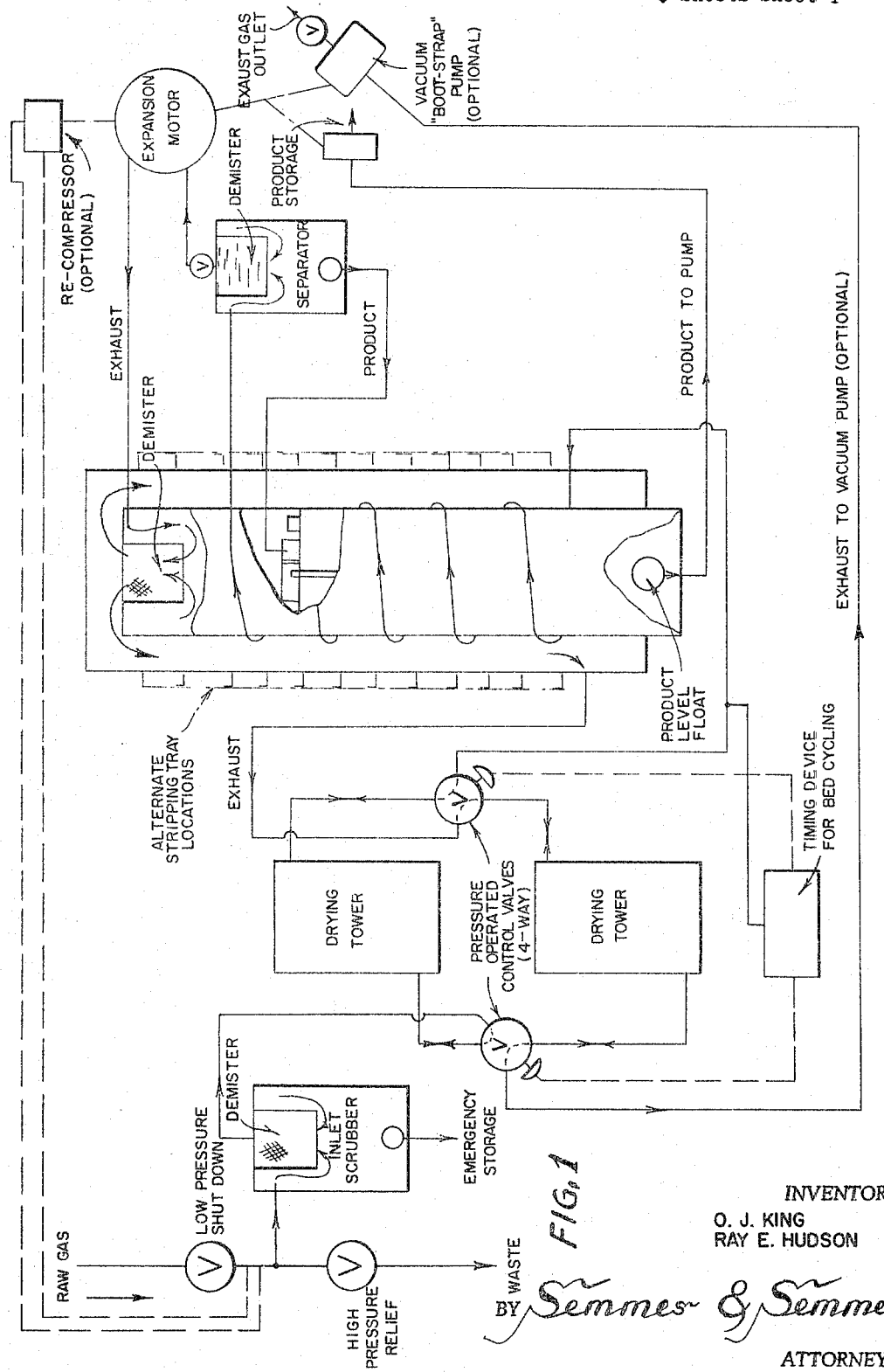

United States Patent Office 3,264,212
Patented August 2, 1966

3,264,212
NATURAL GASOLINE PROCESS AND APPARATUS
O. J. King and Ray E. Hudson, Odessa, Tex., assignors to Basin Recovery Corporation, Midland, Tex., a corporation of Texas
Filed Sept. 28, 1965, Ser. No. 490,864
8 Claims. (Cl. 208—340)

The present invention relates generally to the recovery of liquid hydrocarbons, known as natural gasoline and liquefied petroleum gas, from raw natural gas.

An object of the present invention is to utilize energy normally available in a natural gas source for extracting or separating natural gasoline from natural gas.

Another object of the present invention is to provide a process and system for natural gas liquid recovery in which continuous maintenance is minimized.

More specifically, another object of the present invention is to provide a natural gas liquid recovery unit capable of operating economically below 1,000,000 cubic feet per day characterized by the absence of frequent and continuous supervision.

Another object of the present invention is to provide in a system for recovering natural gasoline from raw natural gas a dual system of dehydrating towers alternatively cycled in such a manner as to permit raw gas passing through one tower to be dehydrated while exhaust gas passing through the other tower re-absorbs previously desorbed water.

Still a further object of the present invention is to provide plural product separation and demisting in a process for recovering natural gasoline from raw natural gas.

Finally, an important object of the present invention is to provide a process and system for recovering natural gasoline without the aid of "outside power" such as electricity, steam or internal combustion.

Other objects of the present invention will become apparent from the ensuing specification and attached drawings, wherein:

FIG. 1 is a schematic diagram illustrating the natural gasoline process of the present invention;

FIG. 2 is a side elevation partly in section of a portion of the natural gasoline recovering system of the present invention illustrating the cooling tower assembly in particular;

FIG. 3 is an enlarged perspective view of a typical stripping tray employed in the cooling tower of FIG. 2;

FIG. 4 is a top view partly in section illustrating the cooling tower and related system of FIG. 2; and FIG. 5 is an end view of that part of the natural gasoline recovering system illustrated in FIG. 2.

In the present invention, as illustrated schematically in FIG. 1, raw natural gas is initially introduced into a scrubber from whence it is transported to a first drying tower for eventual transport to and treatment within a cooling tower in which the heavier hydrocarbons are condensed as natural gasoline. The extraction or separation takes place by reducing the temperature of raw natural gas, at its available pressure, to a temperature which causes the desired condensation of natural gasoline. The uncondensed cold dry natural gas is then expanded within an expansion motor or the like with the resulting gas of reduced temperature introduced into the cooling tower to function as a heat exchange medium for cooling and condensing raw natural gas passing therethrough in the opposite direction. Thereafter, exhausting natural gas is passed through a second drying tower for regeneration of the drying medium by re-absorbing water into the exhaust gas.

The dual drying towers are alternatively cycled to permit raw gas to pass upward through one bed to be dehydrated while the exhausting gas is passed downward through the other tower for regeneration of the drying medium by re-absorbing the water into the exhaust gas.

Of primary importance in the present invention is the capability of the process and system disclosed herein of recovering natural gasoline without the aid of "outside power." In particular, energy available in the raw gases of the system itself is employed for separating the natural gasoline from the natural gas. More specifically, previously separated cold dry natural gas is expanded through an expansion engine to further reduce its temperature and subsequently employed as a cooling medium in the heat exchange separation of liquid and gas.

In general, a rotary, reciprocating or turbine expansion engine or the like is employed to expand the previously separated cold dry natural gas. As seen in FIG. 1, it is possible to load the expansion engine with a vacuum pump which can, in turn, be used as a boot strap to pull a vacuum or as a compressor to pre-compress the natural gas as it enters the unit on the expansion engine thereby increasing the expansion ratio and the temperature drop available, this procedure being limited by mechanical efficiency, of course. Finally, a throttle valve may be placed on the output of the vacuum pump to be used as a control device, such control being necessary because of varying input volumes.

As will be apparent, it is supposed that the raw natural gas is kept in contact with its condensing liquid and separation takes place just prior to leaving the heat exchanger-separator or in some cases may be kept in contact until after passing through expansion motor. This, of course, produces a natural gasoline containing several percent of light components such as methanes, ethanes, propanes and butanes, in addition to the more desirable pentanes and heaviers.

The two possible objections these light components cause pertain to (1) the increased vapor pressure together with associated transport problems and (2) reduction in capacity to recover heavier component caused by fact that the condensation of light components requires the absorption of power through the expansion engine at near the same rate as the more desirable heavy components. If the condensing capacity is great enough, the only problem is the removal of light components from liquid product so that a minimum of the heavy ends are removed. This can be accomplished, of course, in an *external* stabilizer of usual design. If the condensing capacity is limited, however, *internal* stabilizing can be accomplished, in accordance with the present invention, by designing the heat exchanger such that all heat applied or rejected is retained within the heating exhaust gas or cooling inlet gas so that no or very little external heat enters the system thereby resulting in overall increase in recovery of heavy components.

As seen in FIG. 2, cooling tower 10 consists generally of an inner tube 12 which is supported within outer casing 14 defining a passageway generally designated by the reference numeral 16. Proceeding upwardly within passageway 16 are a plurality of heat exchange coils 18 which are wound helically around the periphery of inner tube 12. The ends of heat exchange coils 18 terminate in lower and upper manifolds 20 and 22 as shown in FIG. 2 and 4, respectively. Header 20, which is mounted upon casing 14 at the bottom of cooling tower 10, includes inlet 24 for receiving natural gas through pipe 25 from either drying tower 26 or 28, as previously described with reference to schematic FIG. 1. Header 22 collects the treated natural gas from coils 18 and transmits same through inlet conduit 30 to separating and demisting unit 48. Within the upper wall of unit 48 and located directly above demist 34 is an outlet conduit 36 leading directly to expansion motor 38. Exhaust conduit 40 leads from expansion motor 38 to the top of cooling tower 10 and is introduced therein adjacent demister 42 (FIG. 2) to provide for the up and overflow and demisting of cooled dry natural gas into passageway 16. As the downwardly moving cool dry natural gas, the direction of which is generally designated by the reference numeral 44, passes in heat exchange relationship around coils 18, the desired cooling effect is imparted to the dry natural gas contained within coils 18.

At the bottom of separating and demisting unit 48, as shown in FIG. 5, is an outlet 45 leading to conduit 46 for carrying product from separator 48 to inlets 50 of cooling tower 10 for transmission to #2 tray downwardly into the path of a plurality of stripping or fractionation trays generally represented by the reference number 52 and individually illustrated in detail in FIG. 3, to eventual collection through outlet 52 located at the bottom of cooling tower 10.

As illustrated in FIGS. 2 and 3, stripping trays 52 are stacked within inner tube 12 of cooling tower 10 and include an inlet pipe 54 carrying product from the above tray, a tray base 56, a four (4) inch dam 58 to reduce the active volume on the tray 52, a bubble cap 60, down spout 62 and plates 64 which form a liquid seal and direct flow of product around dam 58 to down spout 62.

As will now be apparent, natural gas may be introduced into either drying tank 26 or drying tank 28 by regulation of the pressure operated control valves in conjunction with the timing device for bed cycling illustrated schematically in FIG. 1. As previously described, drying towers 26 and 28 may be alternatively cycled, for example, to permit raw gas to pass up through bed 66 of tank 26 at inlet pressure to dehydrate the raw gas while exhaust gas is passed down through tower 28 for regeneration of the "bed" and re-absorbing of water. After completing the drying operation, the natural gas passes into manifold 20 and then upwardly along passageway 16 within coils 18 in heat exchange relationship with respect to the cooled dry gas passing downwardly with passageway 16 as represented by the arrows designated by reference numeral 44 in FIG. 2. The treated natural gas is then collected in manifold 22 and conducted along pipe 30 to the separating and demisting unit 32, from whence gas is conducted through conduit 36 to expanding motor 38 for reduction in temperature and subsequently returned to the top of cooling tower 10 through conduit 40 for further demisting and then for downward transport in heat exchange relationship with respect to coils 18. The exhaust gas then leaves cooling tower 10 through conduit 68 and is returned to a selected pressure operated control valve shown schematically in FIG. 1, for introduction into drying tower 28 for regeneration and reabsorbing. Simultaneously, finished product is removed from outlet 45 of separator 48 through conduit 46 and introduced into the top of cooling tower 10 through inlets 50 to #2 tray for downward passage through stripping trays 52. Finally, the finished product is removed from the bottom of cooling tower 10 through opening 52 and pumped to storage.

Manifestly, variation in processing and alternative system equipment may be employed without departing from the spirit of invention, as defined by the sub-joined claims.

We claim:

1. Process for recovering natural gasoline from raw natural gas, comprising:
    (A) dehydrating raw natural gas under pressure in a first tank;
    (B) channeling dehydrated raw natural gas upwardly within a cooling tower from the bottom thereof;
    (C) channeling dry natural gas of reduced temperature downwardly within said cooling tower in heat exchange relationship with respect to said upwardly channeling dehydrated raw natural gas;
    (D) separating condensed heavier hydrocarbons as natural gasoline from uncondensed dry natural gas in said dried raw natural gas;
    (E) expanding said dry natural gas to reduced temperature for downward introduction within said cooling tower; and
    (F) regenerating desiccant with said downwardly channeling dry natural gas at reduced pressure and without the use of heat in a second tank after passage through said cooling tower.

2. Process for recovering natural gasoline from raw natural gas as in claim 1, wherein said first and second tanks are alternatively cycled to permit said raw natural gas to pass upwardly at inlet pressure through one of said tanks for dehydration while said dehydrated natural gas after exhaustion from said cooling tower is passed downwardly through the other of said tanks at reduced pressure and without added heat for regeneration of desiccant by re-absorbing of water.

3. Process for recovering natural gasoline from raw natural gas as in claim 2, including supplementing said expanding of dry natural gas by pulling vacuum on exhaust of natural gas having passed through a motor and downwardly through said cooling tower by the use of power from expansion of gas through said motor.

4. In a system for recovering natural gasoline from raw natural gas, a cooling tower comprising:
    (A) a first vertical conduit containing a plurality of stripping trays arranged in descending order together with product inlet and outlet means at the top and bottom thereof respectively;
    (B) a second vertical conduit surrounding said first conduit defining a passageway therebetween, said second conduit being provided with inlet and outlet means located at the top and bottom thereof respectively for the downward passage of cooled dry natural gas;
    (C) a plurality of heat exchange coils wound helically around said first conduit from the bottom to the top thereof for channeling raw natural gas upwardly within said passageway in heat exchange relationship with respect to said downward passage of cooled dry natural gas; and
    (D) inlet and outlet manifold assemblies in communication with said coils for introducing raw natural gas to said cooling tower.

5. A system for recovering natural gasoline from raw natural gas as in claim 4, including separating and demisting means for removing condensed heavier hydrocarbons as natural gasoline and liquefied petroleum gas from uncondensed dry natural gas in flow leaving said outlet manifold assembly.

6. A system for recovering natural gasoline from raw natural gas as in claim 5, including means for expanding said uncondensed dry natural gas and introducing the resultant gas of reduced temperature to said inlet means of said second vertical conduit of said cooling tower.

7. A system for recovering natural gasoline from raw natural gas as in claim 6, including plural drying and regenerating towers together with timed cycling means for alternatively passing raw natural gas upwardly through one of said towers preparatory to introduction to said inlet manifold of said cooling tower while passing dry natural gas downwardly through the other of said towers after leaving said outlet means of said second vertical conduit.

8. A system for recovering natural gasoline from raw natural gas as in claim 7, including vacuum pump means employed as a boot strap in conjunction with said means for expanding said uncondensed dry natural gas.

References Cited by the Examiner

UNITED STATES PATENTS

| | | | |
|---|---|---|---|
| 1,939,696 | 12/1933 | Hasche | 183—115 |
| 2,323,524 | 7/1943 | Downs | 208—188 |
| 2,601,599 | 6/1952 | Deming | 62—31 |
| 3,964,915 | 12/1960 | Hull | 62—2 |

DELBERT E. GANTZ, *Primary Examiner.*

H. LEVINE, *Assistant Examiner.*